US008345043B2

(12) United States Patent
Kripac et al.

(10) Patent No.: US 8,345,043 B2
(45) Date of Patent: Jan. 1, 2013

(54) SOLVING NETWORKS OF GEOMETRIC CONSTRAINTS

(75) Inventors: Jiri Kripac, Fairfax, CA (US); Jose Madeira de Freitas Garcia, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 1127 days.

(21) Appl. No.: 11/735,363

(22) Filed: Apr. 13, 2007

(65) Prior Publication Data

US 2008/0252663 A1 Oct. 16, 2008

(51) Int. Cl.
*G06T 17/00* (2006.01)
(52) U.S. Cl. ........ 345/420; 345/581; 345/619; 345/672; 703/1
(58) Field of Classification Search .................. 345/848; 715/856; 703/1
See application file for complete search history.

(56) References Cited

U.S. PATENT DOCUMENTS

| | | | |
|---|---|---|---|
| 5,251,290 A * | 10/1993 | Pabon | 345/420 |
| 5,437,008 A | 7/1995 | Gay et al. | |
| 5,452,238 A * | 9/1995 | Kramer et al. | 703/1 |
| 6,490,522 B2 | 12/2002 | Sugiyama et al. | |
| 6,510,379 B1 | 1/2003 | Hasegawa | |
| 6,542,812 B1 | 4/2003 | Obradovich | |
| 6,614,458 B1 * | 9/2003 | Lambert et al. | 715/856 |
| 6,629,065 B1 * | 9/2003 | Gadh et al. | 703/1 |
| 6,897,862 B2 | 5/2005 | Jiang et al. | |
| 7,930,149 B2 * | 4/2011 | Haag et al. | 703/1 |
| 2002/0072848 A1 | 6/2002 | Hamada et al. | |
| 2002/0173905 A1 | 11/2002 | Jin et al. | |
| 2003/0067487 A1 | 4/2003 | Kohls et al. | |
| 2003/0103089 A1 * | 6/2003 | Ramani et al. | 345/848 |
| 2003/0156110 A1 * | 8/2003 | Jiang et al. | 345/420 |
| 2005/0049785 A1 | 3/2005 | Vergin | |
| 2006/0106485 A1 * | 5/2006 | Landers et al. | 700/182 |
| 2006/0250418 A1 | 11/2006 | Chartier et al. | |

OTHER PUBLICATIONS

International Search Report for PCT Application No. PCT/US2008/059676, mailed Apr. 22, 2008.
International Search Report for PCT Application No. PCT/US2008/059676, mailed Aug. 15, 2008.
International Preliminary Report on Patentability for PCT Application No. PCT/US2008/059676, mailed Oct. 13, 2009, 5 pages.

* cited by examiner

*Primary Examiner* — Xiao M. Wu
*Assistant Examiner* — Phi Hoang
(74) *Attorney, Agent, or Firm* — Fish & Richardson P.C.

(57) ABSTRACT

Systems, program products and program products for accepting a request to move a first geometric entity that is constrained to other geometric entities in a drawing that may contain both one-way and two-way geometric constraints. A set of affected geometric entities that need to be repositioned or otherwise changed as the result of moving the first geometric entity is identified. The affected geometric entities and the geometric constraints are classified into groups which are solved using a variational geometric constraint solver. If the geometric constraints cannot be satisfied, the movement of the first geometric entity is restricted. Otherwise the affected geometric entities are updated.

16 Claims, 7 Drawing Sheets

SOLVING NETWORKS OF GEOMETRIC CONSTRAINTS

BACKGROUND

Typical Computed Aided Design (CAD) systems allow users to position geometric entities relative to each other in a drawing. For example, users can create geometric entities in a CAD model such as two or three-dimensional shapes and add geometric constraints that specify the relative positions, sizes or shapes of the geometric entities with respect to each other. After the geometric entities and geometric constraints have been specified or edited, the CAD system can automatically update attributes of the geometric entities (such as changes to point coordinates or line equation coefficients) so that they satisfy the given geometric constraints. This effectively repositions, resizes and reshapes the geometric entities to satisfy the geometric constraints. A software system known as a variational geometric constraint solver (VGCS) is typically used to perform this task. The constraint solver needs to consider all the geometric entities and all the geometric constraints simultaneously to determine new attributes of the geometric entities. This process is similar to solving a system of simultaneous equations in which variables correspond to attributes of the geometric entities and equations correspond to geometric constraints.

The geometric constraint solver may produce unexpected results because geometric constraints link geometric entities together and a single change may transitively propagate to many other geometric entities. For example, in a constrained floor plan of a building, moving one chair in one room might cause the whole building to be reshaped. Even if the result is correct from the mathematical point of view (because all geometric constraints are satisfied) it is probably not the result the user wanted to see. The reason for this behavior is that the geometric constraints are "two-way"—modifying any geometric entity involved in a two-way geometric constraint may modify any other entity involved in the same geometric constraint. Thus, for example, if the chair is constrained to be a certain distance from a wall, moving the chair may cause the wall to move, which may cause other walls to move, and so on.

SUMMARY

In general, one aspect of the subject matter described in this specification can be embodied in a method that includes accepting a request to move a first geometric entity in a plurality of geometric entities, the first geometric entity being geometrically constrained to at least one other geometric entity in the plurality of geometric entities, and where the plurality of geometric entities are constrained by a plurality of geometric constraints including at least one one-way constraint and at least one two-way constraint. A set of affected geometric entities in the plurality of geometric entities are identified that need to be repositioned or otherwise changed based on the request. The set of affected geometric entities and the geometric constraints are classified into a plurality of groups. The groups are solved using a variational geometric constraint solver. If the geometric constraints cannot be satisfied, restricting the movement of the first geometric entity. Otherwise updating the affected geometric entities. Other implementations of this aspect include corresponding systems, apparatus, and computer program products.

These and other implementations can optionally include one or more of the following features. The request for moving the first geometric entity is due to a direct user input to move the first geometric entity or is a result of the first geometric entity being automatically moved in order to satisfy a geometric constraint. A geometric entity is two-dimensional or three-dimensional. A one-way or a two-way geometric constraint can be based on one of the following constraints: distance, angle, radius, coincidence, parallel, perpendicular, collinear, tangential, concentric, equal, horizontal, vertical, or an arithmetic expression involving attribute values.

In general, one aspect of the subject matter described in this specification can be embodied in a method that includes accepting first user input selecting a first and a second geometric entity in a drawing. A second user input is accepted specifying a geometric constraint between the first selected geometric entity and the second selected geometric entity. A third user input is accepted specifying the directionality of the geometric constraint, where the directionality is one-way or two-way. Other implementations of this aspect include corresponding systems, apparatus, and computer program products.

These and other implementations can optionally include one or more of the following features. If the specified geometric constraint directionality is one-way, user input is accepted specifying if the first geometric entity is dependent on the second geometric entity, or vice versa. If the specified geometric constraint directionality is one-way, the movement of the first geometric entity is restricted so that the geometric constraint between the first and the second geometric entity is satisfied without a need to move the second geometric entity. If the specified geometric constraint directionality is one-way, the movement of the second geometric entity is not restricted and movement of the second geometric entity is allowed to cause the first geometric entity to be moved, in order to satisfy the geometric constraint between the first and the second geometric entity. If the specified geometric constraint directionality is two-way, the movement of either the first or the second geometric entity is allowed to cause the other geometric entity to move, in order to satisfy the geometric constraint between the first and the second geometric entity.

Particular implementations of the subject matter described in this specification can be implemented to realize one or more of the following advantages. Networks combining one-way and two-way geometric constraints allow constrained drawings to behave more predictably and these networks can be automatically updated using existing variational geometric constraint solvers. Users can easily select a geometric constraint directionality (e.g., two-way, one-way, no-way) when adding geometric constraints. One-way geometric constraints can prevent unintended change propagation. A unified user experience is provided by which users can create or position geometric entities relative to other geometry in a drawing while specifying the directionality of the geometric constraints a CAD system should create.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

FIGS. 1A-D illustrate the effect of the constraint directionality when a simple constrained drawing is edited. A geometric constraint is used to specify a relation between one or more attributes of one or more geometric entities in a CAD model that governs, for example, the position, size or shape of one or more geometric entities. Examples of geometric constraints are described in TABLE 1 below. A geometric entity is a two or three-dimensional shape which can be created and modified in a CAD drawing. Examples of geometric entities are lines, circles, arcs, spline curves, solid objects, or rigid sets (e.g., collections of other geometric entities that can only be rotated and translated as one non-deformable piece). Other geometric entities are possible. Geometric constraints can be specified during or after creation of geometric entities.

TABLE 1

| GEOMETRIC CONSTRAINT | DESCRIPTION |
|---|---|
| Distance | In a distance constraint, two geometric entities are constrained so that a specified distance is maintained between them. |
| Angle | In an angle constraint, two geometric entities are constrained so that a specified angle exists between them. |
| Radius | In a radius constraint, the radius of a circle or an arc is constrained to have a specified value. |
| Coincident | A coincident constraint ensures that two geometric entities occupy the same location. |
| Parallel | A parallel constraint ensures that two geometric entities are equidistant from one another. |
| Collinear | A collinear constraint ensures that two line segment geometric entities lie on the same line. |
| Perpendicular | A perpendicular constraint ensures that there exists a right angle between the two geometric entities. |
| Tangent | A tangent constraint ensures that two geometric entities touch at a single point. |
| Concentric | A concentric constraint ensures that two geometric entities share the same center point. |
| Equal | An equal constraint ensures that one or more attributes such as volume or length, for example, of two geometric entities are equal. |
| Horizontal | A horizontal constraint ensures that a geometric entity is in a horizontal orientation with respect to the coordinate system. |
| Vertical | A vertical constraint ensures that a geometric entity is in a vertical orientation with respect to the coordinate system. |
| Expressions involving values | An expression constraint is a expression such as, for example, an algebraic expression, a Boolean expression, or combinations of these, that is specified in terms of other geometric constraints such as those detailed in this table, geometric entity attributes, or combinations of these. For example, a distance geometric constraint $d_2$ can be defined as twice the distance geometric constraint $d_1$ plus one, as represented by the following formula: $d_2 = 2 * d_1 + 1$. |

A geometric constraint can be either two-way, one-way or no-way. If two geometric entities are involved in a two-way constraint and one entity is changed (e.g., moved to a different location), the other entity in the constraint may be automatically changed accordingly so that the constraint is satisfied (e.g., a predetermined distance is maintained between the two entities). A one-way geometric constraint has a direction that specifies that a so-called child geometric entity is dependent on a so-called parent geometric entity such that a change to one or more attributes of the parent entity may automatically cause changes to one or more attributes in the child entity in order to satisfy the one-way constraint. However, changes to attributes of the child entity do not cause changes to the parent's attributes and will be prevented if the changed attribute values do not satisfy the constraint between parent and child. When two geometric entities are involved in a no-way constraint, the constraint is used to initially position the geometric entities but thereafter the constraints are not remembered by the CAD system.

Figure 1A:
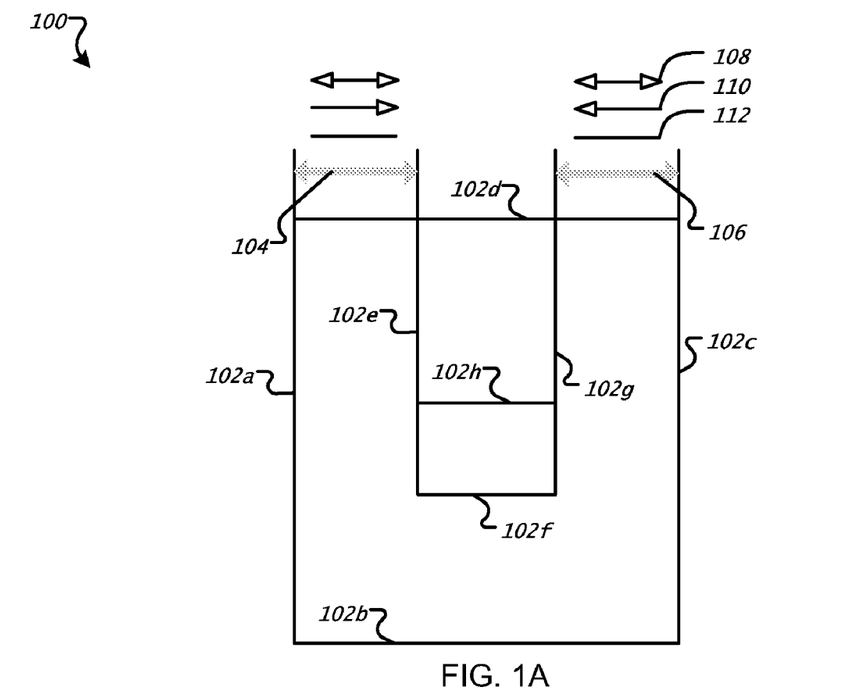
FIGS. 1A-D illustrate the effect of the constraint directionality when a simple constrained drawing is edited.

FIG. 1A is a CAD drawing 100 consisting of eight line segment geometric entities 102a, 102b, 102c, 102d, 102e, 102f, 102g and 102h. A distance geometric constraint 104 exists between line segments 102a and 102e. A second distance geometric constraint 106 exists between line segments 102g and 102c. The directionality of geometric constraint is depicted with arrows. A two-way geometric constraint is depicted by a double-headed arrow 108. A one-way geometric constraint is depicted using a single-headed arrow 110, with the arrow pointing from the parent geometric entity to the child geometric entity. A no-way geometric constraint is depicted using a line 112 that has no arrow heads.

Figure 1B:
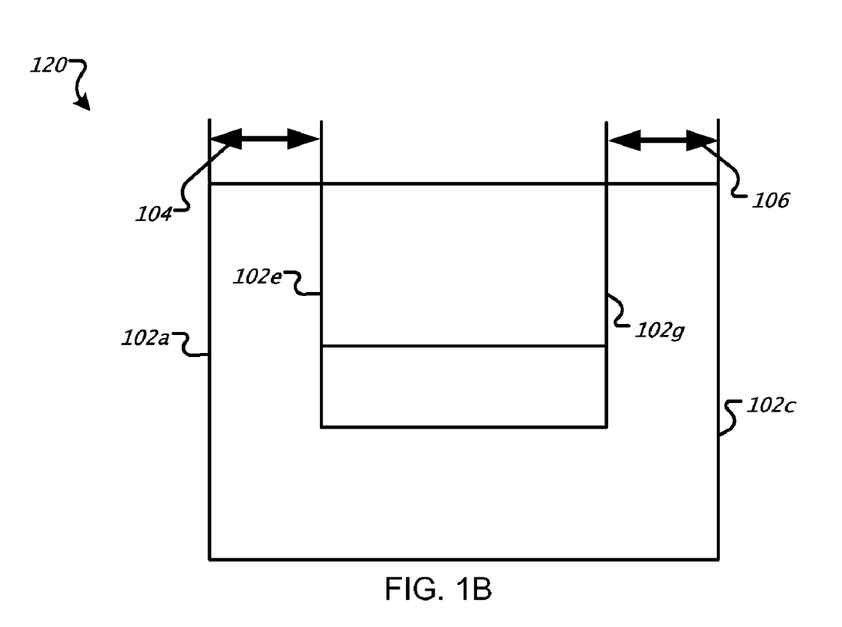

FIG. 1B is a drawing 120 which illustrates changes to the drawing of FIG. 1A that resulted from a user having moved line segments while distance constraint 104 and distance constraint 106 were defined as a two-way constraints. For example, moving line segment 102a horizontally would cause line segment 102e to move horizontally also, to satisfy the constraint 104, and vice versa. Similarly, moving line segment 102c horizontally would cause line segment 102g to also move horizontally to satisfy the constraint 106, and vice versa.

Figure 1C:
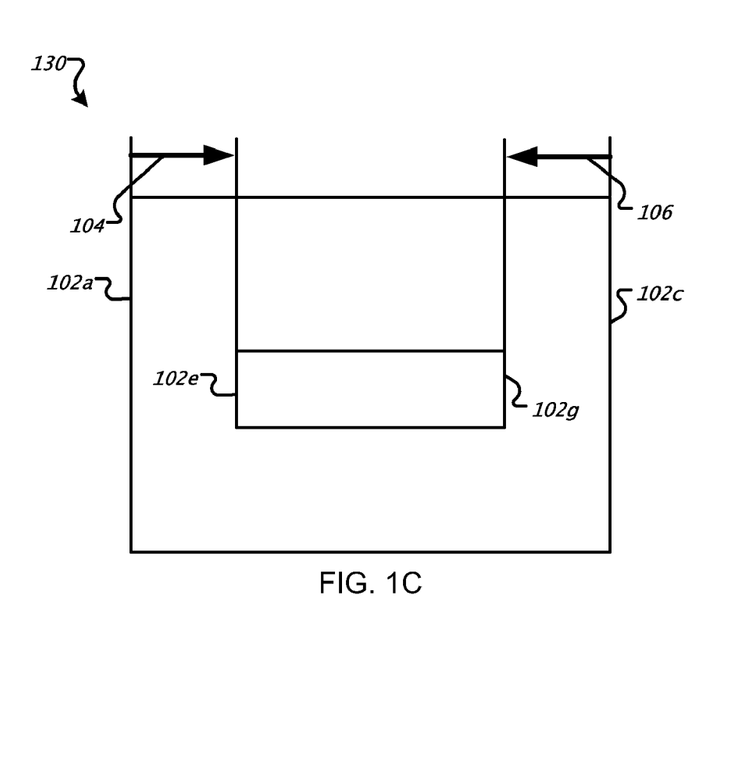

FIG. 1C is a drawing 130 which illustrates changes to the drawing in FIG. 1A that resulted from a user having moved line segment 102a or 102c while the distance constraints 104 and 106 were defined as one-way constraints. A one-way geometric constraint has a direction (as indicated by the arrows for 104 and 106 that defines a dependence of one geometric entity on another. For example, line segment 102e is dependent on line segment 102a, and line segment 102g is dependent on line segment 102c. If a parent entity is moved, the parent's child will automatically be moved to satisfy the distance constraint. For example, moving line segment 102a will cause line segment 102e to move, and moving line segment 102c will cause line segment 102g to move.

Figure 1D:
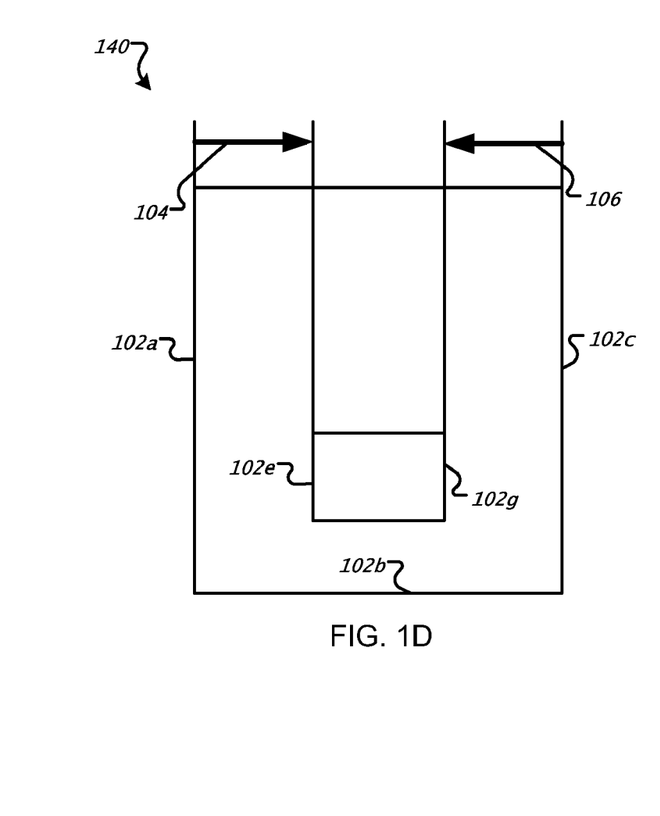

A change can be initiated upon a child geometric entity only if the change does not invalidate a defined constraint with the child's parent geometric entity. For example, horizontal movement of children 102e and 102g is prohibited since this would not satisfy the distance constraints with the children's parents 102a and 102c, respectively. Geometric entities 102e and 102g are allowed to move vertically, however, as shown in drawing 140 of FIG. 1D, since such movements do not violated the constraints 104 or 106. In FIG. 1D, geometric entities 102e and 102g have been moved vertically downward towards line segment 102b. These movements did not change the distance between entities 102a and 102e, or the distance between entities 102g and 102c.

Finally, if the constraints 104 and 106 are no-way, moving line segments 102a, 102c, 102e or 102g would not cause the other line segments to move, because no-way constraints are used to initially position geometric entities but do not establish a permanent constraint.

A geometric entity can be part of more than one one-way and two-way geometric constraint with one or more other geometric entities. Thus the geometric entities and the geometric constraints form a network; the geometric entities being the nodes and the geometric constraints being the directed edges in the network. When an attribute of a geometric entity or a geometric constraint is changed, the network needs to be solved and the attributes of any affected geometric entities need to be updated to satisfy the geometric constraints.

To update the network, all the affected geometric entities are collected in the set of affected geometric entities. This is done by first putting all changed geometric entities and all the geometric entities constrained by the changed geometric constraints into an affected set. All other geometric entities that can be reached, either directly or transitively from the geometric entities in the affected set, by following the direction of the geometric constraints, are added to the affected set. Finally, all geometric entities that share a geometric constraint with some geometric entities already in the affected set are also added to the affected set.

The geometric entities in the affected set are then classified into groups. Each geometric entity is initially classified into its own group. Then two-way geometric constraints are classified into groups. If the two-way geometric constraint is between entities from two or more different groups, these groups are merged together into one group and the two-way geometric constraint is added to the merged group. If the two-way geometric constraint is between entities from the same group, the two-way geometric constraint is added to that group. Then one-way geometric constraints are added to the groups of their child geometric entities. Geometric constraints that have constrained geometric entities not belonging to a group are not added to any group.

The groups are then topologically ordered based on the directions of the one-way geometric constraints between them. For each one-way geometric constraint whose parent geometric entity belongs to a first group and a child geometric entity belongs to a second group, the first group precedes the second group in the topological ordering.

If the groups cannot be topologically ordered, i.e. the precedence relation between some groups forms loops, the constraint network is not solvable. Otherwise the individual groups are solved in the order defined by their topological ordering. To solve a group, all geometric entities and all geometric constraints belonging to the group are passed to a VGCS. Parent geometric entities of one-way geometric constraints belonging to the group are also passed to VGCS and are marked as grounded, i.e. their attributes cannot be changed by VGCS. The VGCS is then called and it simultaneously solves the system of geometric constraints and updates attributes of the geometric entities in the group. If the VGCS cannot solve the group, the geometric entities are not updated and the changes already made to the attributes to other constrained geometric entities are reverted. It is also indicated that the requested changes to the geometric entities or to the geometric constraints are not allowed.

Figure 2:
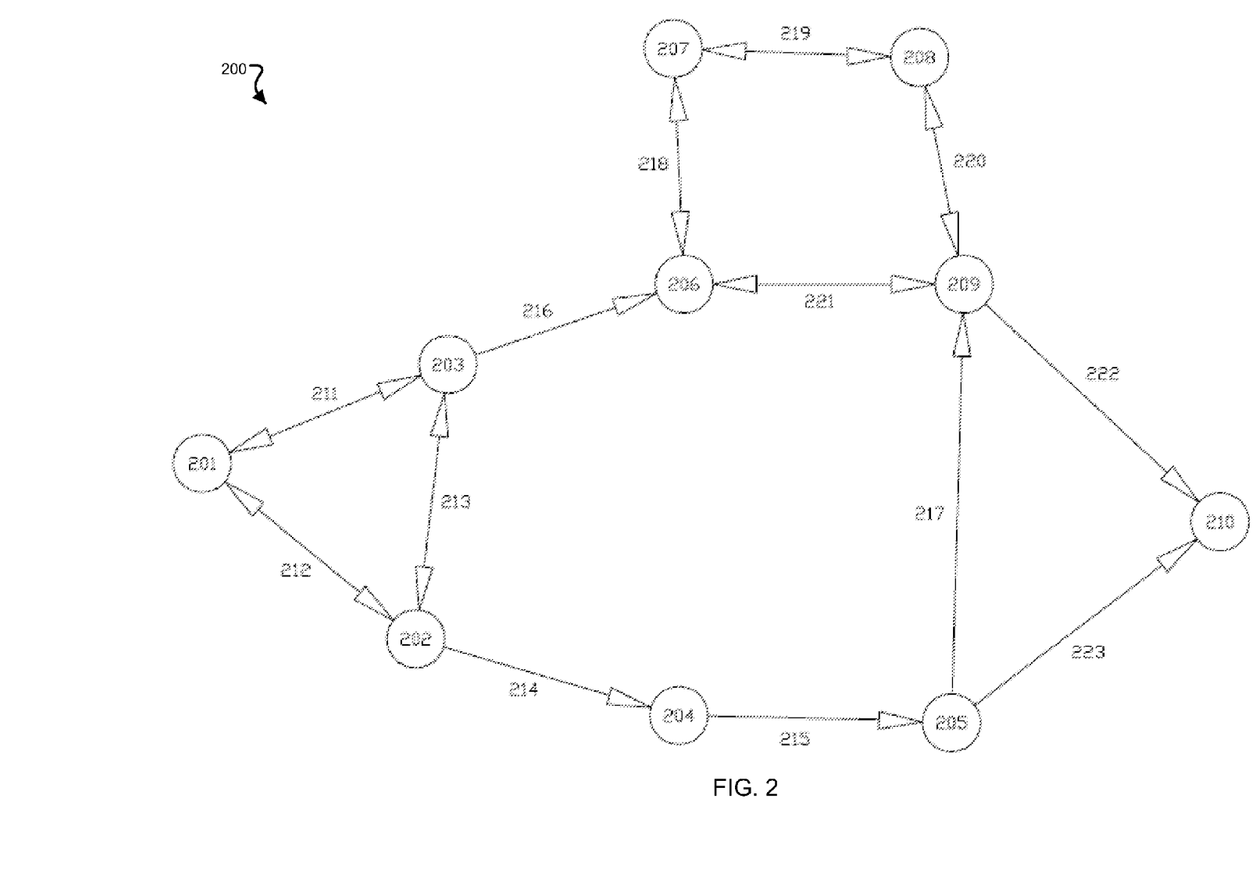
FIG. 2 illustrates the automatic update of a more complex constraint network containing both one-way and two way geometric constraints.

FIG. 2 depicts a constraint network of geometric entities and one-way and two-way geometric constraints and illustrates how the geometric constraint directionality affects the automatic update of the geometric entities in the constraint network when attributes of some geometric entities change. Nodes 201, 202, 203, 204, 205, 206, 207, 208, 209 and 210 represent geometric entities such as lines, arcs and circles. Edges 211, 212, 213, 214, 215, 216, 217, 218, 219, 220, 221, 222 and 223 represent geometric constraints between geometric entities. One-way geometric constraints 214, 215, 216, 217, 222 and 223 are shown as edges having arrows pointing in the direction from the parent geometric entities to the child geometric entities. For example geometric entity 206 is a child of geometric entity 203. Two-way geometric constraints 211, 212, 213, 218, 219, 220 and 221 are shown as edges having arrows at both ends.

If one or more attributes of some geometric entities are modified, such as by direct user interaction or as a consequence of a change propagation from some other geometric entities, the attributes of the geometric entities in the constraint network are automatically updated so that all the geometric entities still satisfy the geometric constraints.

For example, if some attributes of geometric entity 201 change, the automatic update may be performed as follows. First, a geometric constraint solver (e.g., VGCS) is used to update the attributes of geometric entities 202 and 203 so that they satisfy the geometric constraints 211, 212, 213. Then VGCS is used to update the attributes of geometric entity 204 so that it satisfies the geometric constraint 214. Notice that because the geometric constraint 214 is one-way, attributes of the geometric entity 202 are not changed. Then VGCS is used to update the attributes of geometric entity 205 so that it satisfies the geometric constraint 215. Because the geometric constraint 215 is one-way, attributes of the geometric entity 204 are not changed. Notice that geometric entity 204 has two one-way geometric constraints and it is a child geometric entity regarding geometric constraint 214 and a parent geometric entity regarding geometric constraint 215. Then VGCS is used to update attributes of geometric entities 206, 207, 208 and 209 so that they satisfy the geometric constraints 216, 217, 218, 219, 220 and 221. Because geometric constraints 216 and 217 are one-way, the attributes of geometric entities 203 and 205 are not changed. Finally, VGCS is used to update attributes of geometric entity 210 to satisfy the geometric constraints 222 and 223. Because geometric constraints 222 and 223 are one-way, attributes of geometric entities 209 and 205 are not changed.

In another example, if attributes of geometric entity 206 change, such as by direct user manipulation, the constraint network also needs to be automatically updated. Because there is a one-way constraint 216 between the geometric entity 203 and 206, and 206 is the child entity in this geometric constraint, 206 is only allowed to change such that the geometric constraint 216 is preserved. Also, because the geometric entity 206 is connected via two-way geometric constraints with geometric entities 207, 208, 209, a VGCS is used to update the attributes of geometric entities 207, 208, 209 to satisfy the geometric constraints 216, 217, 218, 219, 220 and 221. Thus the change of the geometric entity 206 may further be restricted so that all these geometric constraints can be satisfied. Finally, VGCS is used to update attributes of geometric entity 210 to satisfy the geometric constraints 222 and 223.

Figure 3:
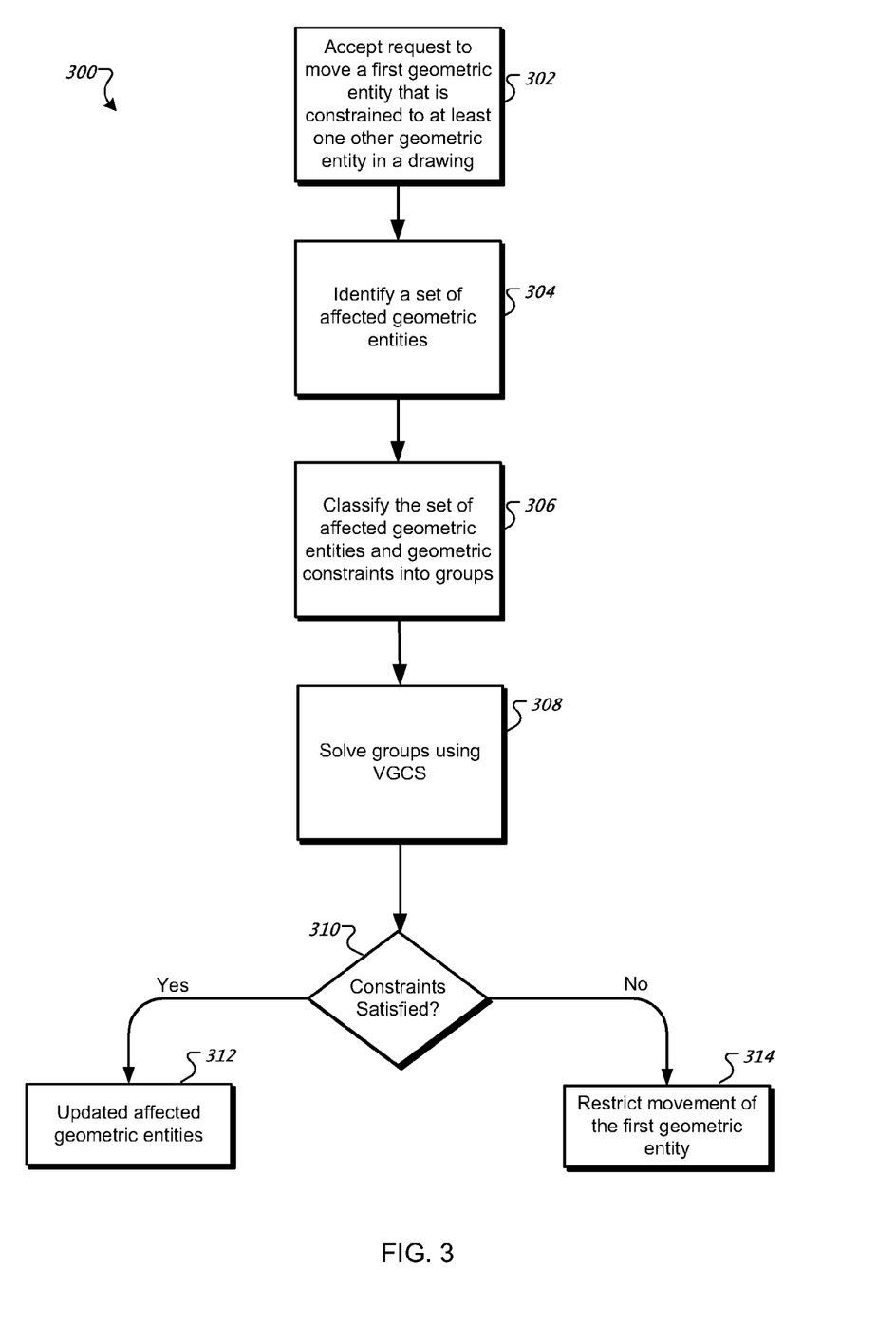
FIG. 3 is a flow chart of a method for updating a network of one-way and two-way geometric constraints.

FIG. 3 is a flow chart of a method 300 for updating a network of one-way and two-way geometric constraints after a geometric entity has been moved or otherwise changed. A request is accepted to move a first geometric entity that is constrained to at least one other geometric entity (step 302). For instance, a user can attempt to move the geometric entity 206 in drawing 200 (FIG. 2). The geometric entities affected by the move are identified (step 304). For instance, the geometric entities 203, 205, 206, 207, 208, 209, 210 can be identified. The affected geometric entities and their one-way and two-way geometric constraints are then classified into groups (step 306) and the groups are then sequentially solved (step 308) by using a VGCS. A check is performed to determine whether the constraints can be satisfied (step 310). If yes, attributes of the affected geometric entities are updated (step 312). If not, the movement of the first geometric entity is restricted (step 314).

Figure 4:
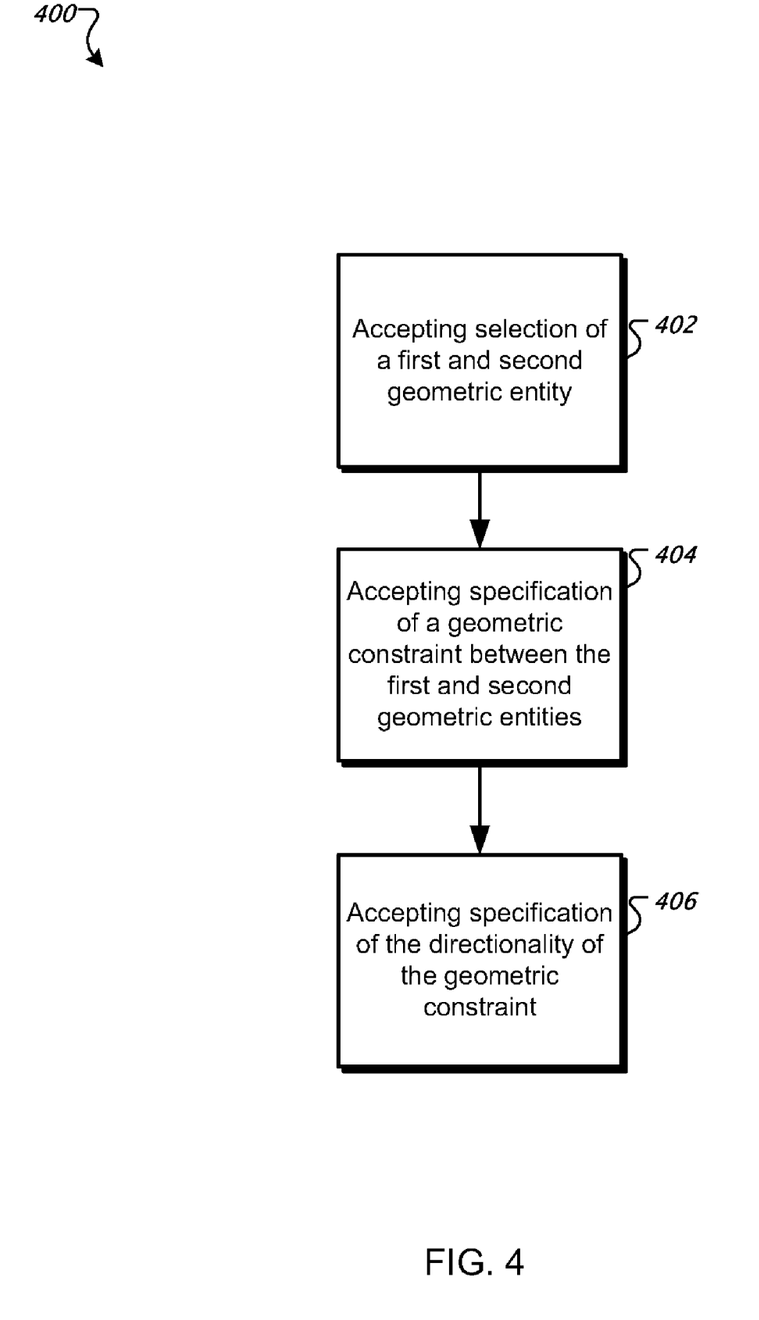
FIG. 4 is a flow chart of a method for specifying a geometric constraint.

FIG. 4 is a flow chart of a method 400 for specifying a geometric constraint. A selection of a first and second geometric entity is accepted (step 402). For example, the user can select geometric entity 206 and geometric entity 203 in drawing 200 (FIG. 2). Selection of the geometric entities can be done by selecting them with the mouse, for example. Selecting the second geometric entity while maintaining the selection of the first geometric entity can be accomplished by a multiple-select operation, such as holding down the shift key while selecting with the mouse. Other means for selecting geometric entities are possible.

Specification of a geometric constraint between the first and second geometric entities is accepted (step 404). While the first and second geometric entities are selected, the user can specify that a geometric constraint should be defined between them. The user can initiate the request by performing a control-key sequence, selecting a context-sensitive menu option, or performing some other similar action. Specification of the directionality of geometric constraint is then accepted (step 406). A geometric constraint can be defined as either no-way, one-way or two-way, and the user can select which directionality they are defining. For example, geometric entities 206 and 203 of FIG. 2 can have a one-way geometric constraint defined between them. If the geometric constraint is directionality is one-way, then the user can specify the direction of the one-way geometric constraint, i.e. which geometric entity is the parent one and which is the child one.

Figure 5:
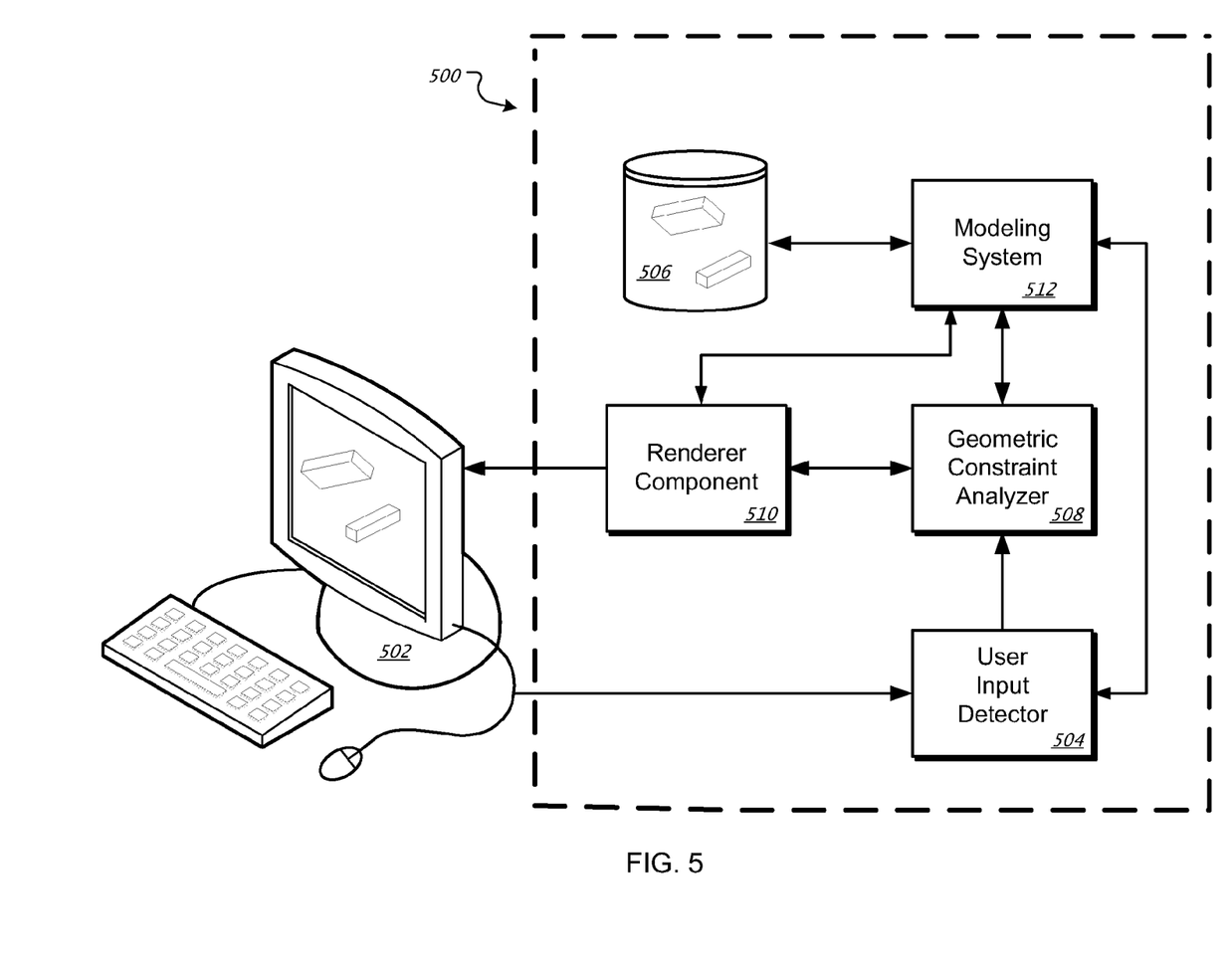
FIG. 5 illustrates a system for providing one-way geometric constraints.

FIG. 5 illustrates a system 500 for providing geometric constraints as might be implemented in a CAD system or other interactive application. Although several components are illustrated, there may be fewer or more components in the system 500. Moreover, the components can be distributed on one or more computing devices connected by one or more networks or other suitable communication means. A user can interact with the system 500 through a computer 502 or other device. For example, the computer 502 can be a computer terminal within a local area network (LAN) or wide area network (WAN). In particular, the user may be utilizing the system 500 to manipulate a geometric entity, which can be stored in a CAD model 506 or other storage. A modeling system component 512 can manipulate the CAD model 506 and can provide various views of the CAD model 506 from different perspectives. The modeling system can be, for example, AutoCAD, available from Autodesk, Inc., of San Rafael, Calif., or another CAD application or other software drawing application. The views or drawings of the CAD model 506 can be displayed on the computer 502 by a renderer component 510.

When the user initiates movement of a geometric entity or other attribute change, a user input detector component 504 receives an indication of such from the computer 502 or a process, for example. Upon detection of the movement, a geometric constraint analyzer component 508 determines if the movement is appropriate in light of any geometric constraints that are in force for the geometric entity that the user attempted to move. For example, if a user attempts to move the geometric entity 206 in drawing 200 (FIG. 2) the geometric constraint analyzer 508 would detect that the movement would violate the geometric constraint between entities 203 and 206. The geometric constraint analyzer 508 can communicate an indication of an invalid move action to the renderer component 510 and the renderer component 510 can provide visual feedback to the user. For example, the renderer component 510 can display the geometric entity using a different outline pattern to indicate that the operation is not allowed and also display visual indications illustrating the geometric constraints that are in effect.

If the geometric constraint analyzer 508 determines that a move is allowed given the current constraints, the geometric constraint analyzer 508 can communicate the movement information to the modeling system 512 so that the modeling system 512 can update the attribute(s) of the geometric entity in the CAD model 506. The modeling system 512 can communicate the change to the renderer component 510 so that the current view can be updated to reflect the change.

Figure 6:
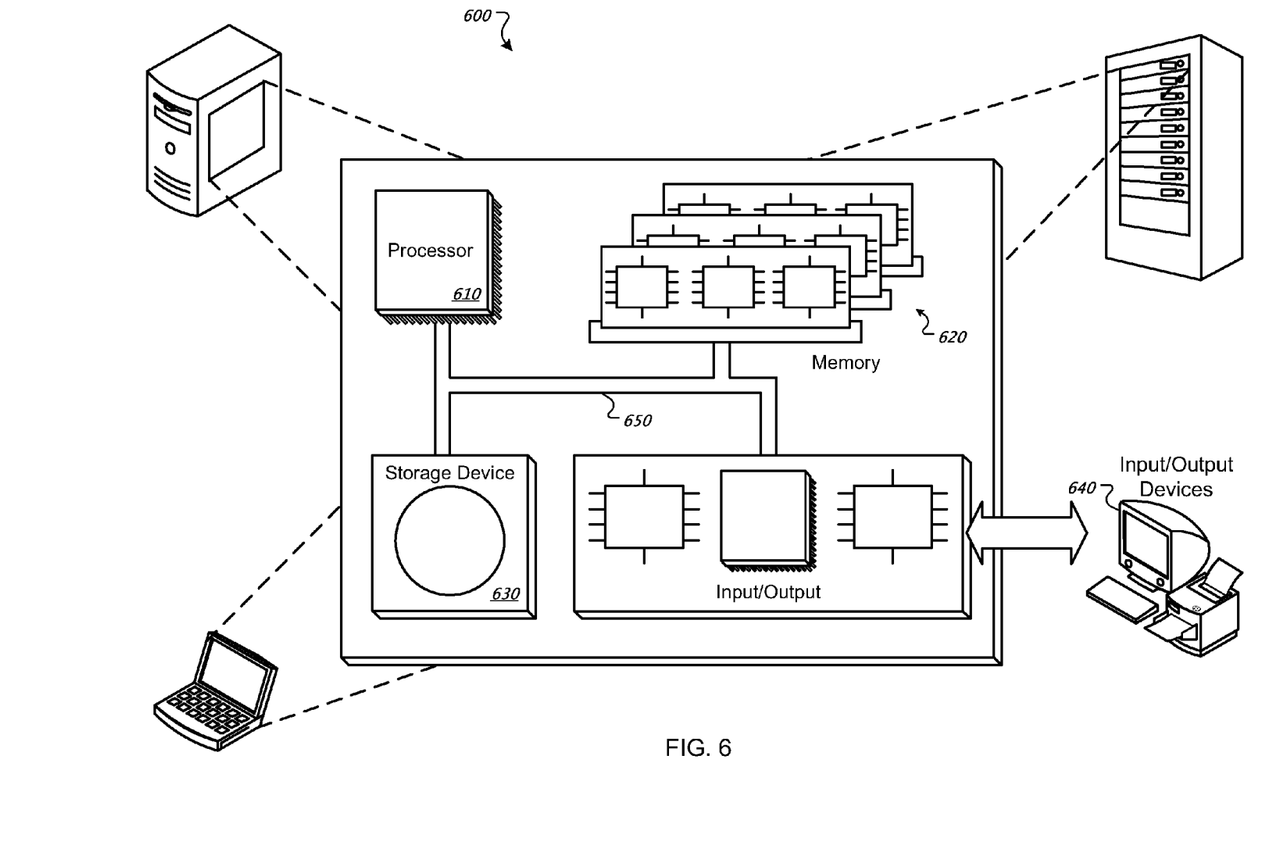
FIG. 6 is a schematic diagram of a generic computer system.

FIG. 6 is a schematic diagram of a generic computer system 600. The system 600 can be used for practicing operations described in association with the methods 300 and 400. The system 600 can include a processor 610, a memory 620, a storage device 630, and input/output devices 640. Each of the components 610, 620, 630, and 640 are interconnected using a system bus 650. The processor 610 is capable of processing instructions for execution within the system 600. Such executed instructions can implement one or more components of system 500, for example. The processor 610 can include one or more processors, can be multithreaded, and can have multiple processor cores. The processor 610 is capable of processing instructions stored in the memory 620 or on the storage device 630 to display graphical information for a user interface on the input/output device 640.

The memory 620 is a computer readable medium such as volatile or non volatile random access memory that stores information within the system 600. The memory 620 could store data structures representing geometric entities and geometric constraints, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The constraint of client and server arises by virtue of computer programs running on the respective computers and having a client-server constraint to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method for solving geometric constraints between geometric entities in a drawing, comprising:
    accepting a request to move a child geometric entity in a plurality of geometric entities, the child geometric entity being geometrically constrained to at least one parent geometric entity in the plurality of geometric entities by a one-way constraint where the one-way constraint constrains changes to the child relative to the parent geometric entity but does not constrain changes to the parent geometric entity;

identifying a set of affected geometric entities in the plurality of geometric entities that need to be repositioned or otherwise changed based on the request;

classifying the set of affected geometric entities and any associated geometric constraints into a plurality of groups based on the geometric constraints and topologically ordering the groups according to directions of constraints between the groups;

solving the groups according to the ordering using a variational geometric constraint solver to determine one or more updated attributes of the child geometric entity;

determining that an updated attribute of the child geometric entity would, if updated, invalidate the one-way constraint with the parent geometric entity; and based on determining that the updated attribute of the child geometric entity would, if updated, invalidate the one-way constraint with the parent geometric entity, restricting movement of the child geometric entity, wherein accepting, identifying, classifying, solving and updating are performed by one or more computers.

2. The method of claim 1 where:
the request for moving the first geometric entity is due to user input to move the first geometric entity or is a result of the first geometric entity being automatically moved in order to satisfy a geometric constraint.

3. The method of claim 1 where:
a geometric entity is two-dimensional or three-dimensional.

4. The method of claim 1 where:
a geometric constraint can be based on one of the following constraints: distance, angle, radius, coincidence, parallel, perpendicular, collinear, tangential, concentric, equal, horizontal, vertical, or an arithmetic expression involving attribute values.

5. The method of claim 1 wherein classifying the set of affected geometric entities into groups also comprises:
classifying geometric entities and two-way constraints in the affected geometric entities each into individual groups, one group per geometric entity and one group per two-way constraint;
if a two-way geometric constraint in the individual groups is for geometric entities from two or more different groups, merging the different groups into a single group along with the two-way geometric constraint group; and
if a two-way geometric constraint in the individual groups is for geometric entities in a same group, adding the two-way geometric constraint to the same group.

6. A computer program product, encoded on a machine-readable storage device, operable to cause data processing apparatus to perform operations comprising:
accepting a request to move a child geometric entity in a plurality of geometric entities, the child geometric entity being geometrically constrained to at least one parent geometric entity in the plurality of geometric entities, and where the plurality of geometric entities are constrained by a plurality of geometric constraints including at least one two-way constraint, and where the child geometric entity and parent geometric entity are constrained by a one-way constraint;
identifying a set of affected geometric entities in the plurality of geometric entities that need to be repositioned or otherwise changed based on the request;
classifying the set of affected geometric entities and the geometric constraints into a plurality of groups based on the geometric constraints and topologically ordering the groups according to directions of constraints between the groups;
solving the groups according to the ordering using a variational geometric constraint solver to determine one or more updated attributes of the child geometric entity;
determining that an updated attribute of the child geometric entity would, if updated, invalidate the one-way constraint with the parent geometric entity; and
based on determining that the updated attribute of the child geometric entity would, if updated, invalidate the one-way constraint with the parent geometric entity, restricting movement of the child geometric entity.

7. The program product of claim 6 where:
the request for moving the first geometric entity is due to user input to move the first geometric entity or is a result of the first geometric entity being automatically moved in order to satisfy a geometric constraint.

8. The program product of claim 6 where:
a geometric entity is two-dimensional or three-dimensional.

9. The program product of claim 6 where:
a one-way or a two-way geometric constraint can be based on one of the following constraints: distance, angle, radius, coincidence, parallel, perpendicular, collinear, tangential, concentric, equal, horizontal, vertical, or an arithmetic expression involving attribute values.

10. The computer program product of claim 6 wherein classifying the set of affected geometric entities into groups also comprises:
classifying geometric entities and two-way constraints in the affected geometric entities each into individual groups, one group per geometric entity and one group per two-way constraint;
if a two-way geometric constraint in the individual groups is for geometric entities from two or more different groups, merging the different groups into a single group along with the two-way geometric constraint group; and
if a two-way geometric constraint in the individual groups is for geometric entities in a same group, adding the two-way geometric constraint to the same group.

11. A system comprising processor electronics configured to perform operations comprising:
accepting a request to move a child geometric entity in a plurality of geometric entities, the child geometric entity being geometrically constrained to at least one parent geometric entity in the plurality of geometric entities, and where the plurality of geometric entities are constrained by a plurality of geometric constraints including at least one two-way constraint, and where the child geometric entity and parent geometric entity are constrained by a one-way constraint;
identifying a set of affected geometric entities in the plurality of geometric entities that need to be repositioned or otherwise changed based on the request;
classifying the set of affected geometric entities and the geometric constraints into a plurality of groups based on the geometric constraints and topologically ordering the groups according to directions of one-way constraints between the groups;
solving the groups according to the ordering using a variational geometric constraint solver to determine one or more updated attributes of the child geometric entity;
determining that an updated attribute of the child geometric entity would, if updated, invalidate the one-way constraint with the parent geometric entity; and based on determining that the updated attribute of the child geometric entity would, if updated, invalidate the one-way constraint with the parent geometric entity, restricting movement of the child geometric entity.

12. The system of claim 11 where:
the request for moving the first geometric entity is due to user input to move the first geometric entity or is a result of the first geometric entity being automatically moved in order to satisfy a geometric constraint.

13. The system of claim 11 where:
a geometric entity is two-dimensional or three-dimensional.

14. The system of claim 11 where:
a one-way or a two-way geometric constraint can be based on one of the following constraints: distance, angle, radius, coincidence, parallel, perpendicular, collinear, tangential, concentric, equal, horizontal, vertical, or an arithmetic expression involving attribute values.

15. The system of claim 11 wherein classifying the set of affected geometric entities into groups also comprises:
classifying geometric entities and two-way constraints in the affected geometric entities each into individual groups, one group per geometric entity and one group per two-way constraint;
if a two-way geometric constraint in the individual groups is for geometric entities from two or more different groups, merging the different groups into a single group along with the two-way geometric constraint group; and
if a two-way geometric constraint in the individual groups is for geometric entities in a same group, adding the two-way geometric constraint to the same group.

16. A computer-implemented method comprising:
receiving a request to change an attribute of a first geometric entity;
determining by one or more processors that a constraint is in place between the attribute of the first geometric entity and one or more attributes of a second geometric entity, wherein the constraint defines a relation between one or more attributes of the first geometric entity and one or more attributes of the second geometric entity;
determining by the one or more processors that the constraint is a one-way constraint including determining that attributes of the second geometric entity are not constrained by attributes of the first geometric entity;
determining that the attribute would, if changed according to the request, invalidate the constraint between the first geometry entity and the second geometric entity; and
based on determining that the attribute would, if changed according to the request, invalidate the constraint between the first geometry entity and the second geometric entity, restricting the requested change to the attribute of the first geometric entity.

* * * * *